Patented Jan. 14, 1941

2,228,993

UNITED STATES PATENT OFFICE 2,228,993

DEODORANT

Arthur W. Goldstein, Cincinnati, Ohio, assignor of sixteen per cent to Leon Goldberg, sixteen per cent to Albert A. Yungblut, and sixteen per cent to Charles E. Howard, all of Cincinnati, Ohio No Drawing. Application November 8, 1938, Serial No. 239,534

8 Claims. (Cl. 167—22)

This invention is directed to a composition adapted to use for deodorizing the air, for instance, in doctors' offices and hospitals, in industrial and air conditioning plants, and for general odor hygiene and similar purposes, and to a method of using the composition. The object of the invention has been to provide a liquid composition adapted to be used for treating air containing obnoxious and malodorous substances, and to freshen the atmosphere in localities where unpleasant odors have accumulated.

In the past, various perfumes have been employed for the purpose of masking disagreeable odors. These substances are sprayed into the air by atomizing devices or are diffused through mechanical apparatus so that the pleasant odors of the perfumes disguise and conceal the unpleasant odors that may be present. The employment of perfumery materials is predicated upon the principle of concealing a disagreeable odor by the substitution of a dominant and more powerful odor of an agreeable nature. However, the employment of perfumery materials is different in principle from the employment of chemical compounds which abate the odors by destroying them.

The compositions of the present invention are liquids adapted to be dispersed or vaporized into the air, for example, as by spraying or atomizing. The atomization of the liquid may be done with a hand sprayer, in instances where the volume of air to be treated is relatively small, or by mechanical diffusion as in a duct in an air conditioning system in a theatre, where it is desired to remove odors of a pungent variety, not removed by the air conditioning equipment. The specific gravity of the liquids is adjusted to enable them to be dispersed very finely. The chemical nature of the liquids endows them with the capacity to abate the odors which are in the air so that prompt deodorization occurs. By reason of the fact that the chemical reaction which takes place when the liquid is sprayed into the air apparently is as relatively complex as the chemical nature of the odorous compounds in the air, the invention is disclosed largely in relation to the liquid deodorizing compositions and the materials which are combined to produce them. Some of the ingredients which are employed in the composition of the present invention also are used in the formulation of perfumes. However, these ingredients combined with the others provide compositions that are chemically reactive when they are injected into the air, and, by virtue of the reactions which take place, the compositions function to destroy the unpleasant odors instead of merely concealing them.

The preferred compositions of the present invention are liquid materials comprised of an aldehyde, a gum resin, an essential oil and an alcohol. I have discovered that this combination of substances peculiarly possesses the capacity chemically to combine disagreeable odors in the air with obnoxious odorous substances carried in the air, and transform them into less obnoxious odor producing bodies. For instance, such compositions immediately or substantially immediately abate such vile odors as those produced by burning rubber, carbon disulphide and putrifying bodies. These compositions, if desirous, may also contain pleasant smelling ingredients or perfumes. In the manufacture of theatre sprays, for example, the addition of such perfumes to the odor abating compositions is sometimes desirable. In other cases, where the deodorant is to be used for destroying disagreeable odors in hospitals and sanitariums, the perfume components generally are not used or recommended for, in such instances the presence of any noticeable odor may be disagreeable to the patients.

Some of the components of the odor abating compositions of the invention themselves are pleasant to smell, and when substantial quantities of these materials are injected into the air for the abatement of odors, a pleasant residual odor may be noticeable for a short period, but directly thereafter the faint residual odor derived from the abating composition passes off and the air becomes odorless.

A preferred composition of the present invention is comprised of anisic aldehyde, myrrh resin, oil of bergamot, phenyl ethyl alcohol and benzyl alcohol. A typical formula is as follows:

*Example 1*

Anisic aldehyde_____approximately 1¼ ounces
Myrrh resin_____approximately 1 1/16 ounces
Oil bergamot_____approximately 5⅓ drams
Phenyl ethyl alcohol__approximately 5⅓ drams Q. S. benzyl alcohol to make approximately 1 gallon.

The benzyl alcohol in this composition is the primary carrier for the components and greatly predominates all of the others in amount. This composition is adapted, and is recommended for general usage in the homes, offices, hospitals, theatres and other public and private places. It is characterized first by its odor destroying potency and second by the fact that little if any residual odor attends its use. The amount of residual odor, of course, depends upon the actual amount of the composition injected into a given volume of air. If large amounts are used the residual odor which remains is pleasant and always very faint. The composition is a very effective one. For instance, the vile odors produced by the skatoles are completely eliminated in a few moments time, more or less depending upon the concentration and confinement of them, or the size of the room or locality in which they are present.

When a liquid such as the one described above is sprayed in the air the components of the liquid rapidly become volatilized and chemical reaction takes place between the vapors so produced and the odorous compounds that are present in the air. The intimacy of contact of the deodorizing vapors and the malodorant fumes is dependent largely upon the degree of dispersion or atomization which is effected. In using the compositions it is preferred to use a good atomizer or spray gun, as distinguished from one of the conventional ventilated fumigators.

In place of the preferred composition of the invention as heretofore disclosed, a variety of other materials of like nature may be employed. At the present time the chemical principles which underlie the activity of these compounds are not clearly understood nor fully appreciated, and the problem is made still more complex by virtue of the fact that most of the materials when purchased in the commercial forms are not chemically pure but contain other components. Moreover, I have determined that it is not requisite to employ all of the components disclosed in the foregoing example, and have found that various sub-combinations also exhibit odor destroying properties which are useful for special purposes. Such combinations usually do not possess all of the properties of the materials as disclosed in the foregoing example and for that reason they are to be treated only as substantial partial equivalents to it.

In order that the present invention may be employed and practiced in the variety of modifications to which it is susceptible the following series of examples is provided. These examples illustrate the various types of modifications and the employment of various chemical substitutes which are either full or partial equivalents of those disclosed. The components disclosed in the example of the preferred composition all are readily available at economical prices and the commercial materials are substantially uniform in chemical purity, or at least in chemical composition. Materials likewise commercially available and uniform in purity are employed in the following examples in most instances, though it will be understood that some of the materials have heretofore found little use and therefore are somewhat less readily available.

*Example 2*

| | | |
|---|---|---|
| Anisic aldehyde | cc | 1 |
| Myrrh resin | cc | 1 |
| Oil of bergamot | cc | 1 |
| Phenyl ethyl alcohol | cc | 1 |
| Benzyl alcohol | ounces | 4 |

*Example 3*

| | | |
|---|---|---|
| Anisic aldehyde | grams | 3 |
| Myrrh resin | do | 2 |
| Oil of bergamot | do | 1 |
| Phenyl ethyl alcohol | do | 1 |
| Benzyl alcohol | ounce | 1 |

*Example 4*

The following examples, A, B and C, illustrate the employment of three of the components of Example 1 in combination with one another.

| | | A | B | C |
|---|---|---|---|---|
| Anisic aldehyde | grains | 12 | 9 | ---- |
| Myrrh resin | do | 8 | 8 | 8 |
| Oil of bergamot | do | 5 | ---- | 5 |
| Phenyl ethyl alcohol | do | ---- | 5 | 5 |
| Benzyl alcohol | ounces | 1 | 1 | 1 |

*Example 5*

| | | |
|---|---|---|
| Myrrh resin | grains | 8 |
| Bromstyrol | do | 9 |
| Oil of bergamot | do | 5 |
| Phenyl ethyl alcohol | do | 5 |

These components are admixed with 2 ounces of benzyl alcohol.

*Example 6*

| | | |
|---|---|---|
| Methyl acetophenone | minims | 4 |
| Bromstyrol | do | 8 |
| Oil of lavender | do | 5 |
| Benzyl cinnamate | do | 5 |
| Citronellal | do | 5 |
| Benzyl alcohol | ounces | 2 |

*Example 7*

| | | |
|---|---|---|
| Terpineol | minims | 10 |
| Bromstyrol | do | 8 |
| Cinnamic aldehyde | do | 5 |
| Oil of lavender | do | 5 |
| Benzyl alcohol | ounce | 1 |

*Example 8*

In 2 ounces of benzyl alcohol are incorporated

| | | |
|---|---|---|
| Oil of bergamot | grains | 5 |
| Anisic aldehyde | do | 9 |
| Phenyl ethyl alcohol | do | 5 |
| Balsam peru | do | 8 |

*Example 9*

This example is similar to Example 1 with the exception that anethol is used in place of anisic aldehyde.

In 2 ounces of benzyl alcohol are incorporated

| | | |
|---|---|---|
| Oil of bergamot | grains | 5 |
| Phenyl ethyl alcohol | do | 5 |
| Myrrh resin | do | 8 |
| Anethol | do | 9 |

*Example 10*

This example is the same as Example 9 except that 9 drams of cinnamic aldehyde are employed in place of the anethol.

It may here be mentioned that benzophenone, methyl acetophenone and cinnamic alcohol may be used in place of the anethol, though, in general, the compounds produced by these materials are either slightly less effective or are somewhat more odorous, and the materials therefore are to be considered as partial equivalents.

*Example 11*

| | | |
|---|---|---|
| Phenyl ethyl alcohol | grains | 5 |
| Anisic aldehyde | do | 9 |
| Myrrh resin | do | 8 |
| Linalool | do | 5 |
| Benzyl alcohol | ounces | 2 |

*Example 12*

This example is the same as Example 11 with the exception that 5 grains of linalyl acetate is employed in place of the linalool.

*Example 13*

| | | |
|---|---|---|
| Linalyl acetate | grains | 5 |
| Balsam peru | do | 8 |
| Cinnamic alcohol | do | 9 |
| Geraniol | do | 5 |
| Benzyl alcohol | ounces | 2 |

This composition is effective for abating odors. It leaves a slight tonka odor.

*Example 14*

If a spicy residual odor is desired the following compositions may be employed:

| | | |
|---|---|---|
| Oil of cloves | grains | 9 |
| Myrrh resin | do | 8 |
| Oil of bergamot | do | 5 |
| Phenyl ethyl alcohol | do | 5 |
| Benzyl alcohol | ounces | 2 |

*Example 15*

| | | |
|---|---|---|
| Linalool | grains | 5 |
| Cinnamic alcohol | do | 9 |
| Benzophenone | do | 5 |
| Balsam peru | do | 8 |
| Benzyl alcohol | ounces | 2 |

*Example 16*

Resin benzoin is employed in place of myrrh resin in a composition similar to that of Example 1, the composition possesses odor abating properties being of diminished potency.

The potency of the compositions varies somewhat in respect to the nature of the odors to be destroyed. An odor from one chemical substance might be destroyed very promptly by a composition which would be somewhat less effective on a different type of odor. The relative potency of the hydrocarbons disclosed in the foregoing specification has been based largely upon the potency exhibited against carbon disulphide fumes as the odor to be abated. The relative potency has been determined by a comparison of the amount of material required to destroy the odor of the fumes. Where greater potency is required, the quantity of alcohol employed may be decreased so that the concentration of the other components is correspondingly increased.

While the quantity of alcohol in each case is predominant, from the present understanding and nature of the compositions, it is believed that the alcohol functions as a chemical as well as a physical carrier, for materials. The investigations indicate that the other components activate the alcohol to accelerate the chemical reaction of the composition with the odorous bodies in the air and the destruction of them. The relative percentages of the components are variable over a substantial range. This may be illustrated in relation to the composition of Example 1, for instance as follows:

| | A | B | C | D |
|---|---|---|---|---|
| | Grains | Grains | Grains | Grains |
| Anisic aldehyde | 60 | 30 | 100 | 50 |
| Myrrh resin | 20 | 70 | 50 | 100 |
| Phenyl ethyl alcohol | 50 | 40 | 20 | 10 |
| Oil of bergamot | 50 | 40 | 10 | 20 |

Each of the above compositions, for instance, may be used for the activation of 1 ounce of benzyl alcohol. The balance of composition C provides an effect which is similar to that of Example 1. The D composition is likewise similar in potency but provides a residual odor suggestive of tea, while those of A and B present a somewhat heavy balsam-like residual odor.

(a)

| | | |
|---|---|---|
| Benzyl alcohol | ounce | 1 |
| Myrrh resin | grains | 8 |
| Phenyl ethyl alcohol | do | 5 |

(b)

| | | |
|---|---|---|
| Benzyl alcohol | ounce | 1 |
| Oil of bergamot | grains | 5 |
| Myrrh resin | do | 8 |

(c)

| | | |
|---|---|---|
| Benzyl alcohol | ounce | 1 |
| Anisic aldehyde | grains | 9 |
| Myrrh resin | do | 4 |

These examples illustrate the employment of phenyl ethyl alcohol with myrrh resin, myrrh resin and oil of bergamot, and myrrh resin plus anisic aldehyde, for activation of benzyl alcohol. The compositions possess distinct odor destroying properties as distinguished from odor producing properties. In general, however, these compositions are not so potent as that disclosed, for instance, in Example 1.

Benzyl alcohol and phenyl ethyl alcohol are substantially soluble in water. Phenyl ethyl alcohol is regarded as a secondary alcohol. In place of the anisic aldehyde, anethol or cinnamic alcohol or cinnamic aldehyde may be used. These substitutes are somewhat more odorous in the finished product than the anisic aldehyde and therefore should not be used where it is desired to avoid a volume of residual odor. Likewise, benzyl benzoate and similar esters, used in conjunction with benzyl alcohol, provide compositions with a greater fragrance. Resin myrrh may be replaced by balsam peru, balsam tolu, resin benzoin, resin storax and the like, for instance, according to Example 1.

It may be noted also that benzyl alcohol does not intensify any latent aroma which may be present in any of the other components. According to the invention, paradoxically, those materials which find usage in the perfumery arts are combined with one another so that their odor value properties are avoided, and compositions in which they are contained are endowed with the capacity to abate odors.

In the use of the compositions, it is the present experience that chemical oxidation precedes evaporation. The compositions are relatively non-volatile and but little evaporation occurs when the deodorants are left to stand in open containers. By virtue of this property they find usage as deodorants for surgical dressings. For this purpose they are sprayed upon the dressing after it is applied to the patient.

This application is a continuation-in-part of application Serial No. 135,770.

Having described my invention, I claim:

1. A composition which is comprised of anisic aldehyde, myrrh resin, oil of bergamot and benzyl alcohol in such proportions that the composition obliterates odors when ejected into air containing odors by chemically destroying the odors.

2. A composition which is comprised of anisic aldehyde, myrrh resin, oil of bergamot, benzyl alcohol and phenyl ethyl alcohol blended in such proportions that the composition obliterates odors when sprayed into the air by chemically destroying the odor producing substances in the air.

3. A composition of matter adapted to be sprayed into the air which consists of small quantities of anisic aldehyde, and myrrh resin, a lesser quantity of essential oil, and a major portion of benzyl alcohol, which components react chemically to remove odors when the composition is ejected into air containing odors.

4. A liquid composition adapted to be sprayed into the air for deodorizing the air comprising, anisic aldehyde, approximately 1¼ ounces, myrrh resin approximately 1¼ ounces, oil of bergamot approximately 5⅓ drams, phenyl ethyl alcohol approximately 5⅓ drams and a quantity of benzyl alcohol sufficient to make approximately 1 gallon of finished solution.

5. An odorous composition of matter for destroying odors, which consists of benzyl alcohol, a gum resin and an essential oil which are blended in such proportions as to destroy odor when the composition is ejected in air containing odors.

6. A composition of matter for destroying odors, which consists of benzyl alcohol, an aldehyde, an essential oil and a material selected from the group consisting of gum resins and balsams, which components are blended in such proportions as to destroy odor when the composition is ejected into air containing odor.

7. A composition of matter for destroying odors, which composition includes a dominant quantity of benzyl alcohol and lesser quantities of a gum resin and an essential oil which possess the capacity chemically to activate the benzyl alcohol and enable the composition to destroy odors when the composition is diffused in air containing odors.

8. A composition of matter which is relatively non-volatile and which includes the major portion of benzyl alcohol and lesser portions of gum resin, aldehyde and essential oil, and phenyl ethyl alcohol, which components are blended together enabling the composition to destroy odors in air when the composition is ejected in air containing odors.

ARTHUR W. GOLDSTEIN.